May 14, 1935.  R. JARRIER  2,000,958
AUTOMATIC SACKING AND WEIGHING APPARATUS
Filed May 1, 1928  3 Sheets-Sheet 1
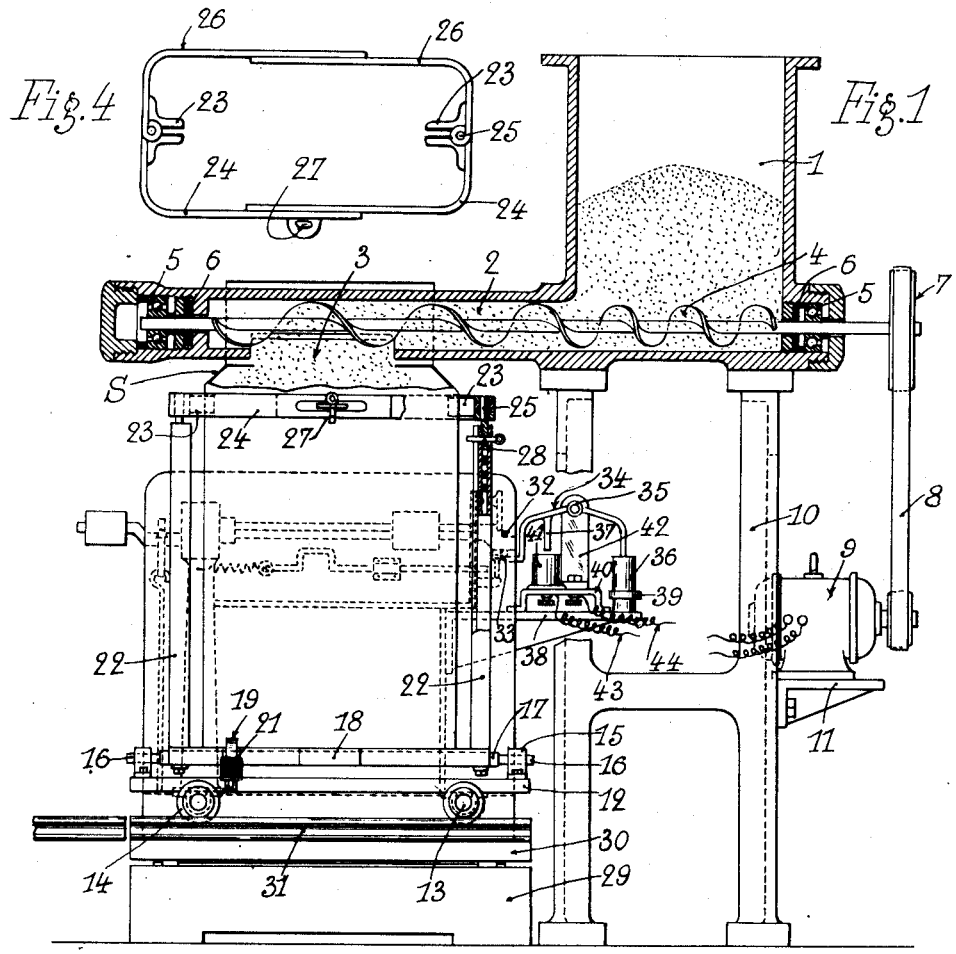
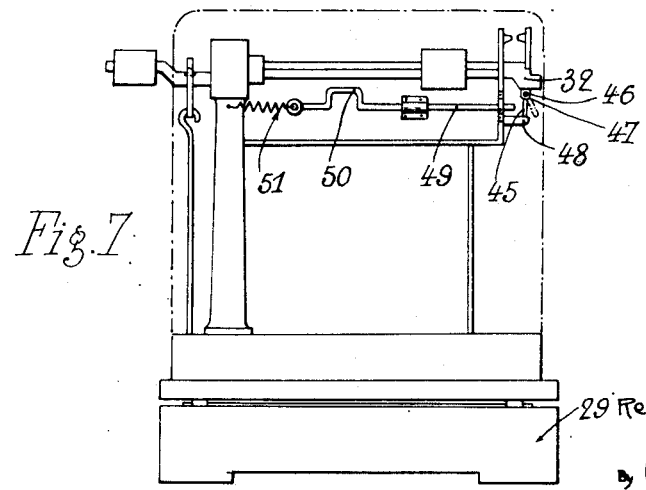
René Jarrier
INVENTOR

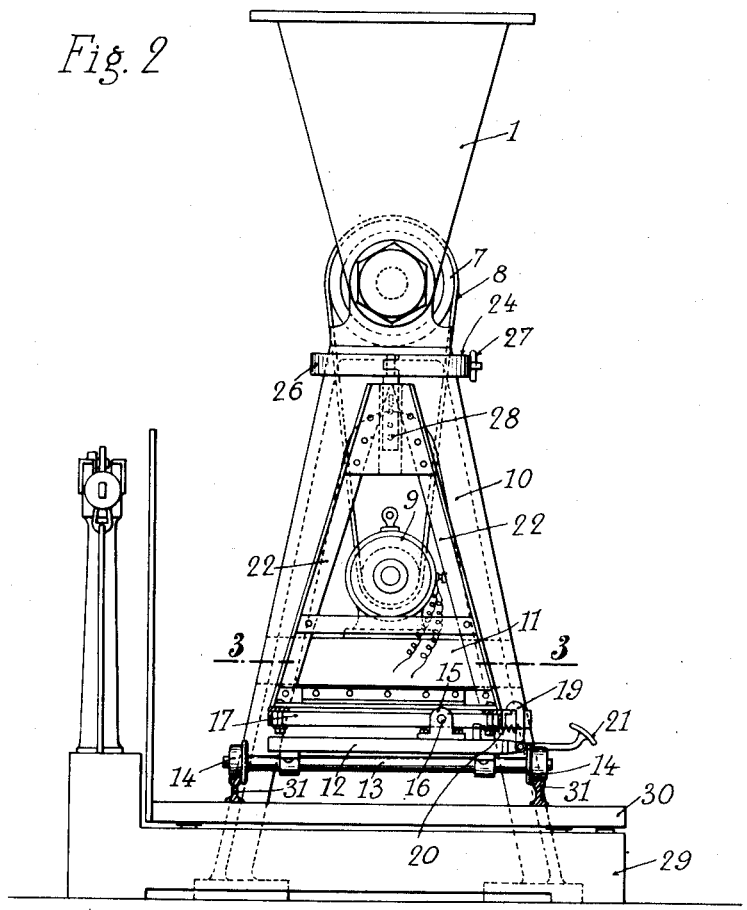
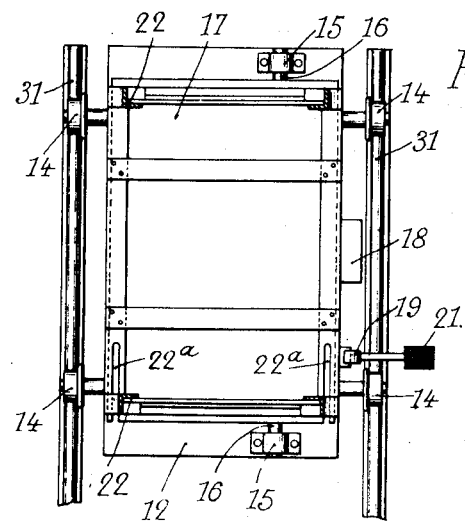

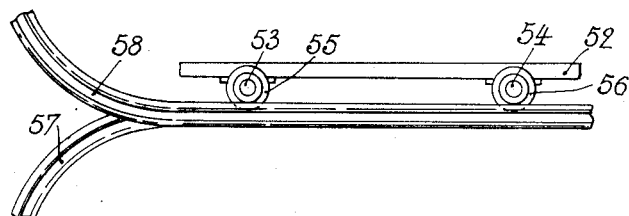
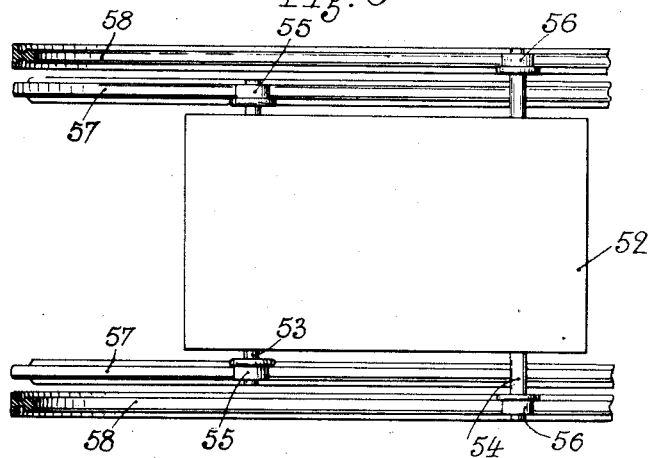
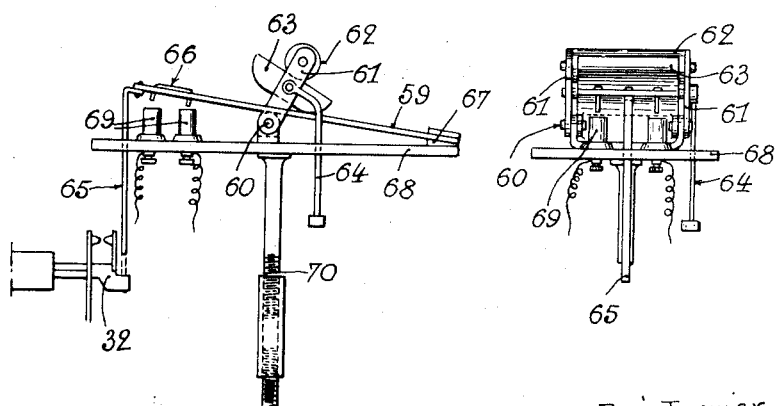

Patented May 14, 1935

2,000,958

UNITED STATES PATENT OFFICE 2,000,958

AUTOMATIC SACKING AND WEIGHING APPARATUS

René Jarrier, St.-Quentin, France, assignor to Bartlett Arkell, New York, N. Y.

Application May 1, 1928, Serial No. 274,329
In France May 20, 1927

9 Claims. (Cl. 249—60)

The present invention relates to an apparatus for the automatic sacking and weighing of material in grains or powder, characterized in that the sack, which is filled by a sacking device, is maintained upon a weighing machine of a known type by suitable supporting means, said weighing machine being adapted for the automatic control of the stopping of the said sacking device when the sack contains a determined quantity of material.

According to another feature of the invention, the apparatus comprises a conveyor of the screw or other type for transporting the material to be placed in the sacks, and the automatic device controlled by the weighing machine will automatically stop the action of the said conveyor.

Another characteristic of the apparatus consists in the fact that the screw of the said conveyor has a gradually increasing pitch. The spiral turns are close together at the start and their spacing gradually increases in order to prevent the clogging of the powdered material in the interior of the conveyor tube in the case in which said material is in a somewhat moist state in which clogging would be apprehended.

Further characteristics of the invention will be specified in the following description with reference to the appended drawings which are given by way of example.

Fig. 1 is a general view of the apparatus, with parts in section, and

Fig. 2 is the corresponding side view.

Fig. 3 is a horizontal section on the line 3—3 of Fig. 2 showing the supporting truck and the discharge of the sacks.

Fig. 4 is a plan view of the arrangement of grips for holding the sack.

Fig. 5 is an elevational view of a modified form of the tipping truck, and

Fig. 6 is the corresponding plan view.

Fig. 7 shows a safety device.

Fig. 8 represents an automatic switching device whose subsequent closing is prevented, and Fig. 9 is the corresponding side view.

In the form of construction herein represented, the apparatus comprises a hopper 1, and a filling tube 2 having at the lower part an aperture 3, and containing the endless screw 4 which is rotatable at each end in a ball bearing 5. Two stuffing-box bearings 6 at the respective ends prevent the material from entering the ball bearings 6. Upon the shaft of the said screw is mounted a pulley 7 which is connected by the belt 8 with an electric motor 9. The said hopper and filling tube rest upon a frame 10 to which is secured the bracket 11 for the electric motor 9.

The apparatus holding the sack S during the loading operation consists of a wheeled truck comprising a bottom plate 12 provided with two axles 13 carrying at the ends the respective wheels 14. Two bearings 15, mounted on the said plate, carry the axle 16 upon which is mounted in the overhung position a movable disc 17 carrying a counterweight 18. A hook 19, controlled by a spring 20, may be operated by a pedal 21. Upon the said movable plate are mounted the uprights 22 forming two trestles, and carrying at the top two pairs of grips 23 faced with india rubber or the like, whose arms 24 are movable on the axles 25. The other two arms 26 of the said grips are stationary, but are slidable upon one another, and said arms 24 can be held in the closed position by the pin 27. The axles 25 are vertically slidable in the guides 28 provided with stopping notches. One of the trestles formed by the uprights 22 may be displaced according to the axis of the apparatus by sliding in the guides 22ᵃ in such manner as to regulate the spacing of the grips 23 according to the width of the sack to be filled.

An ordinary weighing apparatus 29 carries upon its platform 30 the rails 31 adapted for use with the wheels 14 of the wheeled truck. The scale beam 32 rests upon a rod 33 connected with one arm 34 of a rocking lever pivotally mounted on the axle 35; the other arm supports a counterweight 36. The said arm 34 is provided with a stud 37. An insulating plate 38 carries a stop 39 and a second insulating plate 40 on which are mounted a mercury cup 41 and a support 42 for the axle 35. The cup 41 and support 42 are connected with the respective poles of a source of current by the wires 43—44. A small rod 45 is very loosely pivoted on an axle 46 mounted on a plate 47 which is secured to the scale beam 32 and is held in the vertical position by its own weight. The stationary part of the weighing apparatus carries a stop 48 provided with an inclined plane and a rod 49 terminated by a handle 50, controlled by a spring 51.

The operation is as follows:

The sack is placed upon the said wheeled truck, it being held between the grips 23 which are maintained in the closed position by the closing of the arms 24 held by the pin 27. The said truck is pushed upon the weighing apparatus, at the same time, inserting the tube 2 into a valve formed in the sack in such manner that the orifice 3 will properly open into the interior of the sack.

The height of the arms 24—26 is adjusted by sliding the axles 25 in the guides 28 so that the sack will not be hung upon the tube 2 and that its whole weight rests upon the weighing machine through the medium of the wheeled truck.

The rod 49 is pushed by the handle 50, thus turning the rod 45 on the axle 46 so that it will no longer bear upon the stop 48. The scale beam 32 gradually rises as the weight of the sack increases, and the weight 36 turns the rocking lever on the axle 35, thus gradually drawing the stud 37 out of the mercury cup 41. When the weight of the sack attains the proper value, the stud 37 is entirely released from the mercury, the circuit is broken, and the motor 9 stops. The rod 45 rests vertically upon the stop 48, thus preventing all descent of the scale beam, and hence preventing all improper engagement of the switching device. The sack is released from the tube 2 by pushing the wheeled truck off the weighing apparatus and then by pressing the pedal 21 the operator moves the hook 19 and thus releases the movable disc 17 which is rotated on the axle 16 by the weight of the sack. The arms 24 are opened, and the sack is made to slide off the wheeled truck, whilst the weight 18 brings the movable disc 17 into the horizontal position and is again engaged below the hook 19 which is brought into position by the spring 20. The machine is now ready to receive another sack.

The pivoting truck may have a different construction. It may consist of a single plate 52 carrying two axles 53 and 54 on which are mounted the wheels 55 and 56, travelling respectively on the rails 57 and 58, the spacing of the rails 57 being less than the spacing of the rails 58. The said rails 57 and 58 are bent in a vertical plane, the first rails being bent upwardly and the second downwardly. By pushing the truck, the axle 53 will descend along the rails 57 and the axle 54 will make contact with the rails 58, thus giving the plate an inclined position and enabling the sack to slide off by its own weight.

The aforesaid safety arrangement which serves to prevent all improper release of the electric switch device, may be replaced by a circuit-breaker with minimum action. This safety can also be obtained by the switch itself, for instance in the following manner. An insulating plate 59 is mounted loose on an axle 60; two arms 61 are pivoted on the same axle 60 and carry a counterweight 62 and a rocking lever 63; one of the arms 61 is connected with a rod 64. One end of the plate 59 is secured to a rod 65 and carries a bent rod 66 adapted to close an electric circuit; the other end of the plate rests upon a stop 67 mounted on an insulating plate carrying the mercury cups 69 and resting upon screw rod 70. The mercury cups 69 are connected respectively with a source of current and with the poles of the motor 9.

The operation is as follows:

The rod 64 is pushed forward in order to pivot the counterweight 61 upon the axle 60. In this movement, the rocking lever 63 presses upon the plate 59 which turns upon the axle 60 and thus inserts the contacts 66 into the mercury cups 69, thus supplying current to the motor 9. The plate 59 now has the horizontal position. When the sack attains the proper weight, the scale beam 32 makes contact with the lower end of the rod 65, thus slightly raising it and overturning the weight 62; the said weight when falling upon the plate 59 causes the said plate to pivot on the axle 60, thus causing a quick break of the circuit by releasing the contacts 66 from the cups 69. The screw rod 70 allows the vertical adjustment of the rod 65 in such manner that its lower end makes contact with the scale beam when this is in the horizontal position.

Having now described my invention, what I claim as new and desire to secure by Letters Patent is:

1. A machine for the automatic sacking and weighing of materials in a divided state, comprising in combination weighing means, means for conveying the material to be sacked, means operatively connected to said weighing means for automatically stopping said conveying means when a given weight of material has been sacked, a rolling truck, a platform pivoted to said truck about a substantially horizontal axis and means for fastening said platform in the horizontal position and releasing the same at will and supporting means upon said platform for maintaining the sacks in the sacking position.

2. In a machine as claimed in claim 1, the feature of disposing said supporting means in such relation with respect to said horizontal axis that the weight of a filled sack tends to tilt said platform in one direction about said axis, and the provision of means for urging said platform in the opposite direction.

3. A machine for the automatic sacking and weighing of materials in a divided state comprising in combination weighing means, means for supporting a sack on said weighing means, means for conveying the material to be sacked into said sack, a motor for driving said conveying means, a fixed electric contact member in the circuit of said motor, a pivoting member adapted to oscillate about a horizontal axis, a movable contact member on said pivoting member, and in the circuit of said motor, said movable contact member being adapted to cooperate with said fixed contact member, a weighted member operatively connected to said pivoting member in order to be positioned in unstable equilibrium when said contact members are in conductive engagement, a projecting member connected to said pivoting member and adapted to be engaged and moved by a movable part of said weighing means, whereby said weighted member is caused to fall into a stable position thereby bringing the pivoting member into a position in which said contacts are disengaged, and means for restoring at will said weighted member and pivoting member into the closing position.

4. A machine for the automatic sacking and weighing of materials in a divided state, comprising in combination a weighing bridge, a truck adapted to be pushed upon said weighing bridge, a sack supporting platform carried by said truck and adapted to be tipped at will, means for conveying the material into said sack, means operatively connected to the scale beam of said weighing bridge for automatically stopping said conveying means when the sack is filled with a given weight of material, and means for controlling the tipping of said platform.

5. A machine for the automatic sacking and weighing of materials in a divided state comprising in combination a weighing bridge, a hopper, a substantially horizontal tube projecting from the lowest part of the hopper and extending above and across the weighing platform, said tube being provided with a discharge orifice above the weighing bridge and communicating with the interior of the hopper, an endless screw rotatably mounted within said tube and extending into the hopper for conveying the material towards the discharge orifice, power means for rotating said screw, a truck adapted to be pushed upon said weighing bridge, means carried by the truck for supporting a sack in registering position with the discharge orifice, and means operatively connected to the scale beam for automatically stopping said screw when the sack is filled with a given weight of material.

6. A machine for the automatic sacking and weighing in valve-bags of materials in a divided state comprising in combination a weighing bridge, a hopper, a tube having a discharge orifice stationarily supported by the lower part of said hopper and projecting therefrom across the weighing platform, said tube being further adapted to freely enter the valve of the bag, a rotary screw conveyor extending from the bottom of the hopper and within said tube and extending across the discharge orifice, driving means controlled by an electric circuit for actuating said screw conveyor, said electric circuit including switching means arranged to be set out of conductive relation in response to the displacement of the scale beam, whereby the screw conveyor will be automatically stopped when the sack has been filled with a predetermined weight of material.

7. A machine for the automatic sacking and weighing in valve-bags of materials in a divided state comprising in combination a weighing bridge, a hopper, a tube having a discharge orifice stationarily supported by the lower part of said hopper and projecting therefrom across the weighing platform, said tube being further adapted to freely enter the valve of the bag, a rotary screw conveyor extending from the bottom of the hopper and within said tube and extending across the discharge orifice, driving means controlled by an electric circuit for actuating said screw conveyor, said electric circuit including a swingingly mounted switch disposed in the path of the end of the scale beam so as to be struck by the latter to cut off said circuit and stop the conveyor in response to the sack being filled with a predetermined weight of material.

8. An automatic sacking and weighing machine for materials in a divided state comprising in combination a weighing bridge, means for conveying the material to be sacked into said sack, driving means controlled by an electric circuit for actuating said conveying means, said electric circuit including switching means comprising a stationary electric contact member, a pivoting member adapted to swing about a horizontal axis and carrying a contact member adapted to cooperate with said stationary contact member, a counterweight adapted to cooperate with said pivoting member to hold the contact members in conductive engagement and so positioned that it will be in unstable equilibrium at the same time, said weight being further arranged in operative relation with the free end of the scale beam of said weighing bridge so as to be slightly displaced in response to the latter coming into its balance position, whereby it will fall into a stable position thus rotating the pivoting member into a position where said contacts are disengaged.

9. In an automatic sacking and weighing machine as claimed in claim 8, the further feature residing in that means operatively connected with said weight is disposed in the path of the free end of the scale beam so as to be struck by the latter coming into its balance position.

RENÉ JARRIER.